Figure 1:
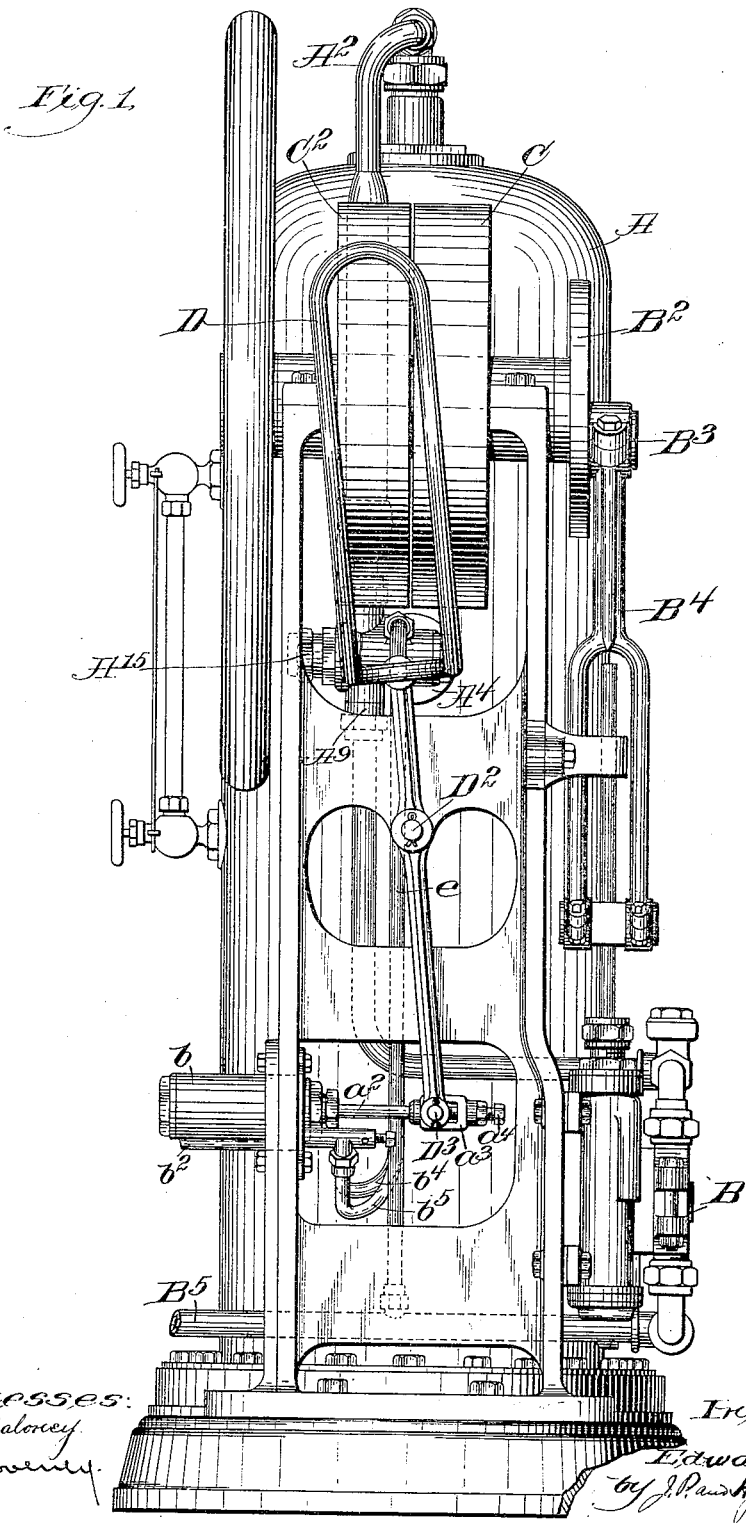

No. 767,419. PATENTED AUG. 16, 1904.
E. E. MURPHY.
AUTOMATIC CONTROLLER FOR CARBONATORS.
APPLICATION FILED JAN. 15, 1904.
NO MODEL. 3 SHEETS—SHEET 1.

Witnesses:
Jas. J. Maloney
W. E. Coveney

Inventor:
Edward E. Murphy
by J. Paul H. Livermore
Attys.

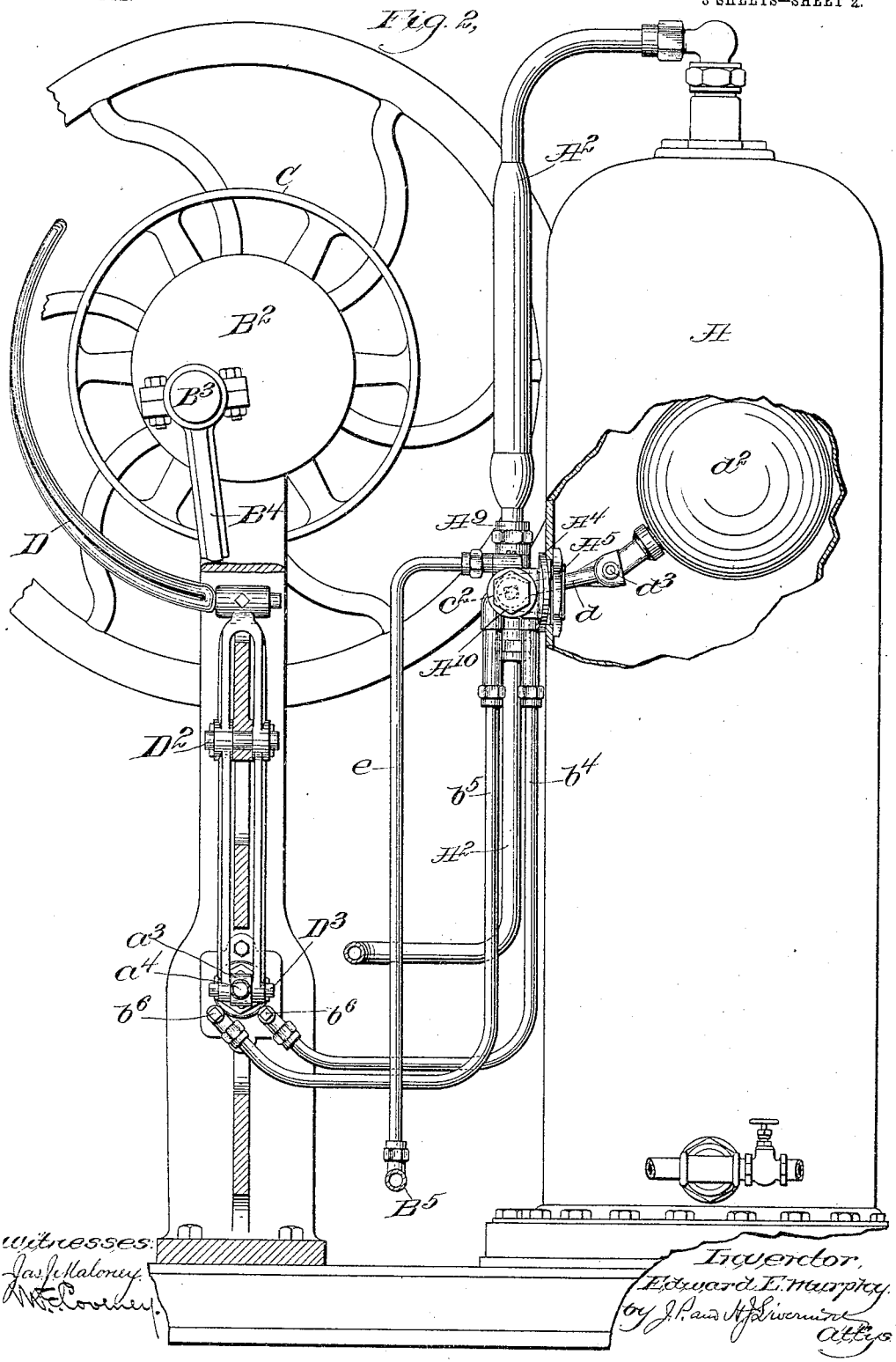

No. 767,419. PATENTED AUG. 16, 1904.
E. E. MURPHY.
AUTOMATIC CONTROLLER FOR CARBONATORS.
APPLICATION FILED JAN. 15, 1904.
NO MODEL. 3 SHEETS—SHEET 3.
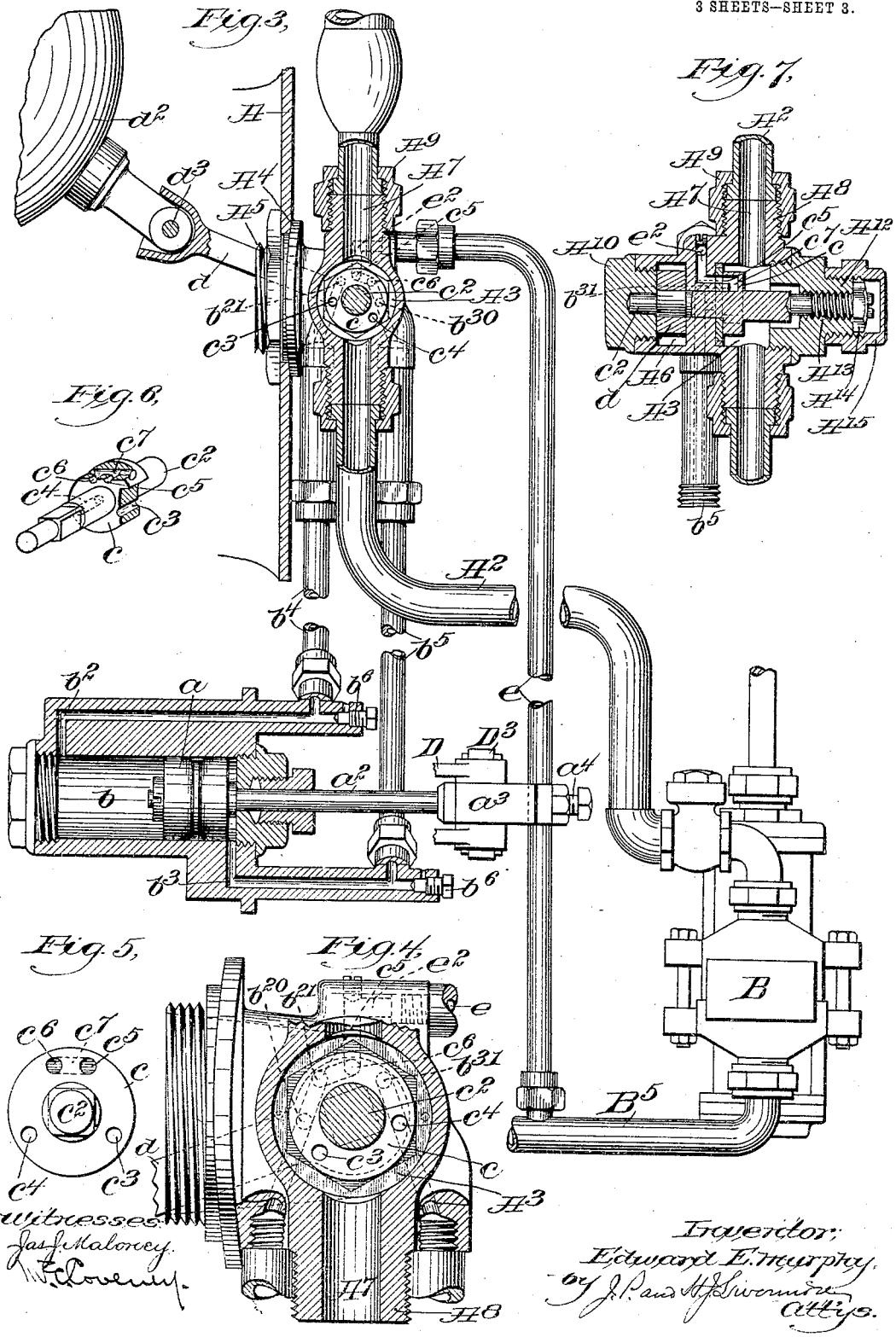

No. 767,419.

Patented August 16, 1904.

UNITED STATES PATENT OFFICE.

EDWARD E. MURPHY, OF CHELSEA, MASSACHUSETTS, ASSIGNOR TO PUFFER MANUFACTURING COMPANY, A CORPORATION OF MAINE.

AUTOMATIC CONTROLLER FOR CARBONATORS.

SPECIFICATION forming part of Letters Patent No. 767,419, dated August 16, 1904.

Application filed January 15, 1904. Serial No. 189,187. (No model.)

*To all whom it may concern:*

Be it known that I, EDWARD E. MURPHY, of Chelsea, in the county of Suffolk and State of Massachusetts, have invented an Improvement in Automatic Controllers for Carbonators, of which the following description, in connection with the accompanying drawings, is a specification, like letters on the drawings representing like parts.

The present invention relates to an automatic controller for carbonators of that class in which water is pumped into a chamber containing carbonic-acid gas, so as to become charged with gas in the chamber.

The controller embodying the invention is designed to control the motor which operates the pump so as to start the pump when the water in the carbonator-chamber reaches a predetermined low level and to stop the pump when the water has risen to the desired high level.

The controller embodying the invention, which is adapted to act upon a starting and stopping device for a motor of any type, is arranged to operate in response to the pressure of the gas in the carbonator through the action of a piston which is adapted to receive pressure on one side or the other in response to the operation of a valve controlled from within the carbonator-chamber, as by a float. The piston is contained in a cylinder which has ducts at opposite sides of the plunger, the said ducts leading to a valve-seat located in a chamber forming part of the inlet-pipe, through which water is supplied from the pump to the carbonator. These ducts are so controlled by a valve as to be either closed entirely or to be placed in communication with the supply-passage or with an exhaust-port, the valve being so arranged that when one duct is in communication with the supply-passage the other will be in communication with the exhaust. When, therefore, the valve reaches either of its extreme positions, the liquid in the supply-pipe, which is under the pressure of the gas in the carbonator-chamber, will be placed in communication with the piston-cylinder at one side of the piston, while the duct at the other side of the piston will be placed in communication with the exhaust-passage, the said exhaust-passage being herein shown for convenience as leading to the suction side of the pump. This causes the piston to travel in the chamber and in so doing to operate a motor-controller with which it is connected.

Figure 1 is an elevation of an apparatus embodying the invention. Fig. 2 is an elevation with parts shown in section, the view being taken at right angles to Fig. 1. Fig. 3 is a section somewhat in the nature of a diagram, the section through the valve-chamber being taken vertically, while the section through the piston-cylinder is taken horizontally for the purpose of better showing the parts and their connections. Fig. 4 is an enlarged sectional detail of the valve, similar to Fig. 3, but with the valve shown in the other position. Fig. 5 is a face view of the valve on the same scale as Fig. 4. Fig. 6 is a perspective view of the valve, partly shown in section. Fig. 7 is a vertical section taken at a right angle to the section shown in Fig. 3.

The carbonator-chamber A, which may be of any suitable or usual construction and supplied in any suitable or usual way with gas, is supplied also with water through a pipe $A^2$ from a pump B, which is herein shown as an ordinary suction-pump arranged to be operated by means of a rotary member $B^2$, such as a disk, which has a wrist-pin $B^3$, connected, by means of a pitman $B^4$, with the pump-plunger. While any suitable motor may be used to operate the pump, the apparatus is herein shown as supplied with a driving-shaft provided with fast and loose pulleys C and $C^2$, the controlling device being shown as a belt-shifter D, pivoted at $D^2$ and connected with the automatically-operated controller. The said controller, as best shown in Fig. 3, consists of a piston $a$ in a chamber $b$, herein shown as a cylinder, the said chamber having at opposite sides of the plunger ducts $b^2$ and $b^3$, the said ducts being controlled by a valve $c$, located in a chamber $A^3$, formed in the supply-pipe $A^2$. The valve $c$ is shown as a disk mounted on a stem $c^2$, which extends through an opening in a wall of the chamber $A^3$, the said stem forming a bearing for the disk, which seats against the said wall and controls ports therein, the arrangement of which will be hereinafter described. The chamber $A^3$ is shown as formed in a single member or casting having a flange $A^4$ to fit the outside of the carbonator-chamber A and a tongue $A^5$, which projects through an opening in the wall of the chamber, so that the casting may be clamped to the said wall. The casting, as best shown in Fig. 7, is further provided beyond the wall of the chamber $A^3$ with a recess $A^6$, into which the stem $c^2$ projects, the said stem where it extends into said recess being squared to receive an arm $d$, to which is connected a ball or float $d^2$. As herein shown, Figs. 2 and 3, the ball or float $d^2$ is pivotally connected at $d^3$ with the arm $d$, so that a comparatively long movement of the said arm may be obtained under the influence of the float, although the arm itself is comparatively short, as is necessary, owing to the small size of the carbonator-chamber A. The raising and lowering of the arm $d$ as the water in the chamber A rises or falls communicates a rotary movement to the stem $c^2$, thus turning the valve $c$ with relation to its seat, which, as previously stated, is formed in the chamber $A^3$. Said seat is provided with five ports, (see Figs. 3 and 4,) the ports $b^{20}$ and $b^{21}$ both communicating with the duct $b^2$ through the pipe $b^4$, while the ports $b^{30}$ and $b^{31}$ both communicate with the duct $b^3$ through the pipe $b^5$. A further duct $e^2$ communicates with an exhaust-pipe $e$, which may have any suitable waste-outlet, but is herein shown as leading to the suction-pipe $B^5$ of the pump B, thus avoiding the necessity of connecting it with a waste-passage.

The valve $c$ is provided with four ports $c^3$, $c^4$, $c^5$, and $c^6$, the ports $c^3$ and $c^4$, as best shown in Fig. 6, extending completely through the valve $c$, so as to admit communication therethrough with the pipe $A^2$, while the ducts $c^5$ and $c^6$ communicate with a pocket $c^7$, formed in the disk $c$, the said pocket $c^7$ connecting the two ducts without affording any communication with the pipe $A^2$. The ports are so positioned, as best shown in Figs. 3 and 4, that when the float $d^2$ is in one position—that shown in Fig. 3, for example—the port $c^3$ is in line with the port $b^{20}$, while the port $c^6$ is in line with the port $b^{31}$ and the port $c^5$ in line with the port communicating with the exhaust-duct. The water in the pipe $A^2$, which is under the pressure of the gas in the carbonator-chamber A, is thus forced into the duct $b^2$ through the pipe $b^4$, while the duct $b^3$ is placed in communication through the pipe $b^5$, ports $b^{31}$, $c^6$, and $c^5$ with the exhaust-pipe $e$. The result is that the piston $a$ is forced to the right to the position shown in Fig. 3, thus acting through the piston-rod $a^2$ upon the belt-shifter D, with which it is connected at $D^3$. This throws the belt upon the loose pulley $C^2$, as shown in Fig. 1, so that the operation of the pump B is stopped. While the valve $c$ is in this position the ports $b^{30}$ and $b^{21}$ are closed by the face of the valve, so that the water flows into the duct $b^2$ and out of the duct $b^3$, producing the operation above described. As the carbonated water is drawn off from the carbonator-chamber A the float $d^2$ will be lowered, and while the valve $c$ is in an intermediate position all the ports are closed, and the piston $a$ is held in the position shown by the water, which is trapped in the cylinder $d$. When the level of the water in the carbonator-chamber A has reached the desired low limit, so that it is necessary to recharge the chamber, the valve $c$ will have been drawn to the position shown in Fig. 4, in which communication between the pipe $A^2$ and the duct $b^3$ is provided for through the port $c^4$ and the port $b^{30}$, the port $b^{20}$ then being closed and the port $b^{21}$ in communication through the ports $c^5$ and $c^6$ with the exhaust-passage $e^2$. The water is then forced by the pressure of the gas into the duct $b^3$, while the water in the chamber $b$ at the left-hand side of the piston $a$ is free to flow out through the exhaust-passage, the result being that the piston travels to the left and shifts the belt from the loose pulley $C^2$ to the fast pulley C, thus starting the pump B. The pump will obviously continue to operate until the water has risen in the carbonator-chamber A to such a level as to shift the valve $c$ to the position shown in Fig. 3, when the pump will be stopped, as hereinbefore described.

As has been previously stated, the chamber $A^3$ and the recess $A^6$ are formed in a single member or casting, which is provided with a transverse passage $A^7$, having threaded portions $A^8$ to receive the sections of the inlet-pipe $A^2$, which are connected therewith by means of couplings $A^9$. Between the chamber $A^3$ and the recess $A^6$ are formed the several ducts, which communicate, respectively, with the exhaust-pipe $e$ and with the ducts $b^2$ and $b^3$, these ducts opening through the wall of the chamber, which constitutes the valve-seat. The chamber $A^3$ is open at the outer end for the insertion of the valve $c$, the stem $c^2$ of which projects through an opening in the wall between the chamber $A^3$ and recess $A^6$, the end of the stem having a bearing in a plug $A^{10}$, which is screwed into one side of the member aforesaid. At the opposite side the chamber $A^3$ is closed by means of a plug $A^{12}$, and in the said plug is a screw-threaded member $A^{13}$, which bears against the end of the stem $c^2$, the said member being provided with a lock-nut $A^{14}$ to hold it in place after the valve $c$ has been forced firmly to its seat. As herein shown, the member $A^{13}$ and the lock-nut $A^{14}$ are covered by means of a cap $A^{15}$. The ducts $b^2$ and $b^3$, which are formed in the walls of the cylinder $b$, are connected with the ducts formed in the valve member by means of the pipes $b^4$ and $b^5$. For convenience the said pipes are shown as coupled with lateral projections from the parts of the cylinder $b$ in which the ducts are formed, the said ducts being extended beyond the pipes and closed by means of plugs $b^6$, which can be removed for the purpose of cleaning out the ducts or passages, if necessary.

The piston-rod $a^2$ is herein shown as provided at the end with a yoke $a^3$, having a threaded stem $a^4$, one end of which bears against the transverse pin $D^3$, connected with the forked extremity of the belt-shifting member D, so that the connection between the said member and the piston-rod $a^2$ may be adjusted, the difference in direction of movement at the same time being compensated for.

While the construction hereinbefore described constitutes a practical embodiment of the invention, it is obvious that modifications may be made without departing from the invention.

What I claim is—

1. In a controlling device for a carbonator-pump, a motor and a motor-controller; a piston forming an actuator for said motor-controller; a chamber for said piston, provided with ducts at opposite sides of said piston; a valve, controlling communication through said ducts between said chamber and the interior of the carbonator-chamber; and means located wholly within the carbonator-chamber for automatically controlling said valve, as set forth.

2. In a controlling device for a carbonator-pump, a motor; a motor-controller; a carbonator-chamber and an inlet-pipe leading from said pump to said chamber; a cylinder and a piston therein connected with said motor-controller; ducts leading from said cylinder to said inlet-pipe, said ducts being at opposite sides of said piston; a valve to control said ducts; and a float in the carbonator-chamber connected with said valve, as set forth.

3. In a controlling device for a carbonator-pump, a motor; a motor-controller; a carbonator-chamber and an inlet-pipe leading from said pump to said chamber; a cylinder and a piston therein connected with said motor-controller; ducts leading from said cylinder to said inlet-pipe, said ducts being at opposite sides of said piston; a valve to control said ducts; an arm connected with said valve and projecting into the carbonator-chamber; and a float pivotally connected with said arm, as set forth.

4. In a controlling device for a carbonator-pump, a motor; a motor-controller; a valve member having a chamber, one wall of which constitutes a valve-seat; a valve having a stem projecting transversely through said chamber, and bearing against said seat; ports formed in said seat; a cylinder and piston therein, said cylinder being provided with ducts, one at each side of the piston, each duct communicating with two of the ports aforesaid; an exhaust-pipe communicating with another of the ports; and ports formed in the valve for connecting one of said ducts with the chamber, and the other with the exhaust-pipe, in accordance with the position of the valve, as set forth.

5. In a controlling device for a carbonator-pump, a motor; a motor-controller; an inlet-duct leading from the carbonator-pump to the carbonator-chamber; a valve-shell coupled in said duct, and also secured in an opening in the wall of the carbonator-chamber; a valve-chamber in said shell; a valve mounted on a stem extending through said chamber; a float-lever connected with said stem outside the said valve-chamber and projecting into the carbonator-chamber through the opening in the wall thereof; and means for operating the motor-controller in response to the action of said valve.

In testimony whereof I have signed my name to this specification in the presence of two subscribing witnesses.

EDWARD E. MURPHY.

Witnesses:
MARGARET E. COVENEY,
HENRY J. LIVERMORE.